United States Patent [19]

Rahrig et al.

[11] 4,028,086
[45] June 7, 1977

[54] APPARATUS FOR BENDING AND TEMPERING GLASS SHEETS BY DIFFERENTIAL COOLING

[75] Inventors: Donald D. Rahrig; Robert G. Revells, both of Toledo, Ohio

[73] Assignee: Libbey-Owens-Ford Company, Toledo, Ohio

[22] Filed: Feb. 25, 1976

[21] Appl. No.: 661,368

[52] U.S. Cl. .............................. 65/273; 65/285; 65/351
[51] Int. Cl.² ........................................ C03B 23/02
[58] Field of Search ............. 65/104, 273, 285, 351

[56] References Cited

UNITED STATES PATENTS

| 3,545,951 | 12/1970 | Nedelec | 65/104 |
| 3,801,298 | 4/1974 | Bezombes | 65/104 |

*Primary Examiner*—Arthur D. Kellogg
*Attorney, Agent, or Firm*—Collins, Oberlin & Darr

[57] ABSTRACT

An apparatus for bending and tempering heat-softened glass sheets by differentially cooling the opposite surfaces of the sheets to warp or bow the sheets to desired curvatures. The sheets are conveyed through the tempering section by a series of upper and lower conveyor rolls, each of which is formed of a two-piece construction and curved in a manner providing adequate support for the opposite ends thereof and permitting easy access into the inner regions of the tempering section.

6 Claims, 6 Drawing Figures

APPARATUS FOR BENDING AND TEMPERING GLASS SHEETS BY DIFFERENTIAL COOLING

BACKGROUND OF THE INVENTION

The present invention relates generally to the bending of glass sheets and, more particularly, to an improved apparatus for producing bent, tempered glass sheets without the use of any glass contacting bending fixtures.

Conventionally, the commercial production of bent, tempered sheets of glass, such as are used as glazing closures in automobiles and the like, include the steps of heating flat glass sheets to a temperature corresponding substantially to the softening point of the glass, bending the flat sheets into the desired curvatures, and then tempering the bent sheets by rapidly chilling the same to a temperature below the annealing range of the glass. The actual bending of the sheet is accomplished by permittng the heat-softened sheet to sag under the influence of gravity against a concavely curved shaping surface formed on an outline or skeleton-type bending mold or by pressing the heat-softened sheet between a pair of opposed complemental shaping surfaces. The subsequent tempering is usually effected by flushing the opposite surfaces of the heated sheet with a suitable cooling medium, such as air or the like, to chill the glass sheet and impart the desired stresses therein.

Still another technique for bending glass sheets in a mass production operation is disclosed in U.S. Pat. No. 3,396,000, assigned to the same assignee as the present invention, wherein the opposite surfaces of a heated glass sheet are differentially cooled as the sheet advances through the opposed blastheads of a chilling station in such a manner as to warp or bow the sheet to a preselected curvature without the use of a bending mold or any other bending fixture. This is done by varying the pressure or volume of air against the opposite surfaces so that one surface cools at a faster rate than the other surface. Traditionally, the upper surface is cooled at a faster rate than the lower surface to cause the sheet to arch or bend upwardly away from the conveyor rolls.

It is sometimes desirable to arch the glass downwardly such as for example when processing heated backlights, i.e., glazing closures having a printed heating circuit superimposed on the concave side of the glass or the inboard surface thereof as installed in an automobile. The fired circuit, generally formed of an electrically conducting silver-glass frit, must be located upwardly out of contact with the conveyor rolls while conveyed through the furnace to prevent the wetted or melted frit from smearing. Accordingly, the glass sheet must be bowed downwardly in a direction away from the frit circuitry. When processing such glazing closures, it is apparent that greater air pressure must be applied to the bottom surface than the upper surface of the glass sheet in order to cool such bottom surface at a faster rate to effect the downwardly directed curvature when the glass leaves the conveyor rolls. In order to prevent the glass sheet from fluttering or floating upwardly off the rolls into contact with the tubes of the upper blasthead as a result of this differential pressure, it has been found that a series of upper conveyor rolls in closely vertically spaced relation to the lower rolls can be employed to restrain upward movement of the sheet. However, problems are encountered in maintaining such rolls in a true horizontal, thereby inducing undesirable vibrations which adversely affect the desired curvature imparted to the sheet and often results in excessive glass breakage. Because of the closely spaced relation between the upper and lower rolls, allowing for only a small clearance between the glass sheet and the rolls, the size of the bearings for at least one opposite end of the roll must be compromised, rendering it incapable of adequately accommodating the loads imposed thereon. As a result, such bearings wear rapidly, causing the associated roll to wobble and run out during operation. Moreover, replacement of defective bearings and/or rolls poses problems because of limited access into the tempering section with consequent increased production downtime, adding materially to the costs of production.

Also, since all the tubes of the lower blasthead were formed integral with the upper plate of the manifold housing and arranged in a relatively closely spaced pattern across the entire surface area thereof, the removal of glass particles or cullet resulting from occasional glass rupture and breakage during the tempering operation posed problems. Moreover, damage to only a portion of the lower blasthead or only a few of the tubes required replacement of the entire lower blasthead.

SUMMARY OF THE INVENTION

It is, therefore, a primary object of the present invention to obviate the above noted disadvantages by providing a new and improved apparatus for bending and tempering flat glass sheets by differentially cooling the opposite surfaces thereof.

It is another object of this invention to provide in the foregoing apparatus improved conveyor rolls for conveying the glass sheets through the tempering section and which are disposed in a close vertically spaced relation while being provided with adequate support mountings therefor to maintain the desired shape of the glass sheets and to minimize glass breakage.

It is a further object of the present invention to provide in the foregoing apparatus, blastheads comprised of a plurality of modules to facilitate cullet removal and ease of replacement.

The foregoing and other objects, advantages, and characterizing features of the present invention will become clearly apparent from the ensuing detailed description thereof considered in conjunction with the accompanying drawings wherein like reference numerals denote like parts throughout the various views.

BRIEF DESCRIPTION OF THE DRAWINGS

FIG. 3 is a cross sectional view, on an enlarged scale, taken along the line 3—3 of FIG. 1;

FIG. 4 is a fragmentary, longitudinal sectional view, on an enlarged scale, of a conveyor roll and the drive coupling associated therewith;

FIG. 5 is a fragmentary perspective view of the mounting of one end of a conveyor roll constructed in accordance with the principles of the invention.

DESCRIPTION OF THE PREFERRED EMBODIMENT

Figure 1:
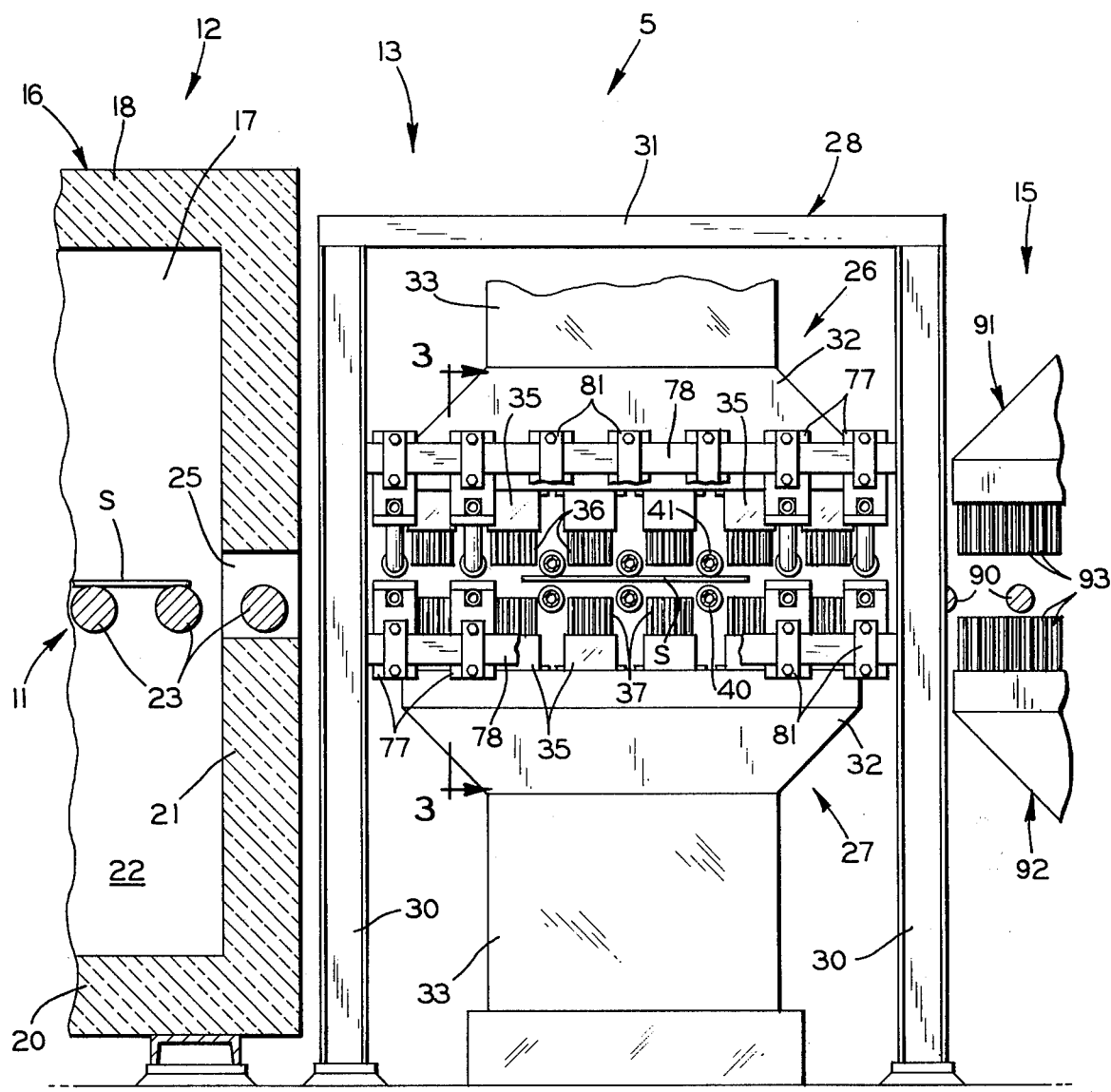
FIG. 1 is a longitudinal, side elevational view, partly in section and with parts broken away, of a bending and tempering apparatus incorporating the novel features of the present invention.

Referring now in detail to the illustrative embodiment depicted in the accompanying drawings, there is shown in FIG. 1 an apparatus, comprehensively designated 5, for bending and tempering a flat glass sheet or a succession of sheets in accordance with the present invention. While not restricted thereto, it will be convenient to describe the apparatus and the operation thereof in connection with the production of a glazing closure in the form of a heated backlight 6 (FIG. 2) utilized in the rear window opening of an automobile and the like. The backlight 6 is formed of a bent or curved glass sheet provided with an electrical heating circuit or grid, generally designated 7, comprising a plurality of substantially parallel, electrically conducting frit lines 8 on the inwardly directed concave or inboard surface of the glazing closure. These lines 8 are connected at the opposite ends to electrodes or bus bars 9 located at either side of the glass sheet and having suitable terminals (not shown) thereon for connection to the automobile electrical system. These frit lines 8 appear only as very fine lines on th inboard surface of the sheet so as not to materially obstruct the viewing area, their size being somewhat exaggerated in FIG. 2 for purposes of illustration. These frit lines, which are printed on the glass surface prior to heating and bending, are positioned on the inboard surface to minimize deterioration thereof otherwise resulting from weathering and excessive abrasive cleaning after subsequent installation in an automobile.

The apparatus 5 includes a continuous conveyor system, generally designated 11, adapted to support a plurality of flat glass sheets S in a generally horizontal plane for movement along a continuous, substantially horizontal path through a heating section 12, a tempering section 13, and a cooling section 15, the sections being contiguous so that a sheet passes immediately from one section to the next succeeding section.

In the illustrated embodiment, the heating section 12 comprises a tunnel-type furnace 16 having a heating chamber 17 defined by a top wall 18, bottom wall 20, a rear end wall 21, and opposite side walls 22, all formed of a suitable refractory material. The heating chamber 17 can be heated in any desired manner by suitable heating means, such as gas fired burners or electrical resistance elements for example (not shown), located in the top, bottom and/or side walls of furnace 16. These burners or electrical heating elements preferably are arranged and controlled to provide heat patterns or zones of progressively increasing temperatures from the entry end to the exit end of furnace 16. The sheets S are advanced through the heating chamber 17 on a series of conveyor rolls 23, which form a part of the conveyor system 11, and extend from the entry end (not shown) of the furnace 16 to the oppositely disposed exit end thereof. When processing sheets having frit lines thereon, as in the illustrated embodiment, the sheets must be placed on conveyor rolls 23 in a manner disposing the imprinted frit line surface upwardly away from the rolls to prevent contact therewith and the possible smearing or running of the heat-softened frit lines. The sheets S are heated to substantially the softening point of the glass during their passage through chamber 17 and are discharged through an opening 25 in the rear end wall 21 of the furnace 16 and then into the tempering section 13 between the upper and lower blastheads 26 and 27.

The upper and lower blastheads 26 and 27 in tempering section 13 are supported on a structural frame 28, which includes a framework of vertically disposed columns 30 and horizontally extending beams 31 interconnected and tied together to form a rigid, box-like construction. Each blasthead comprises a plenum chamber 32 formed by an enclosure and provided with an air inlet 33 at one end thereof and a series of modules or projecting sections 35 at the other end thereof carrying a plurality of downwardly and upwardly directed tubes 36 and 37, respectively, through which chilling air under pressure is directed against the opposite surfaces of the glass sheets as they are carried therebetween. Preferably, the sections 35 are detachably secured to the plenum chamber enclosure for selective removal and/or replacement whereby one or more sections can be readily replaced, when necessary, without disturbing the remaining sections. This arrangement also facilitates the removal of cullet and debris accumulated on the lower blasthead.

In accordance with the present invention, upon passage of the heated sheets between the upper and lower blastheads 26 and 27, the upper and lower surfaces of the heated sheets are differentially chilled causing the sheets to warp or bend to the desired curvature. In the present invention, this differential cooling is accomplished by directing more air against one surface of the sheet than against the other surface thereby removing heat from one surface at a faster rate than from the other surface. Varying the amount of air directed on either of the surfaces is effected by regulating the pressure of the cooling air in the blastheads 26 and 27.

While not restricted to any particular theory, it is believed that the differential cooling of the top and bottom surfaces of the glass sheet causes a differential in the rate of contraction of these surfaces and that the sheet warps to compensate for this difference in rate of contraction. In any event, it has been found that the sheet bows or arches toward that surface which is cooled at a faster rate. This is believed due to the fact that the layer of glass at the one surface being cooled at a faster rate sets before it contracts to any appreciable degree and while the remainder of the sheet is in an expanded condition. Then as the cooling continues, such remainder of the sheet contracts to a greater extent than the one surface, thereby bowing or arching the sheet in the direction of such one surface.

Figure 2:
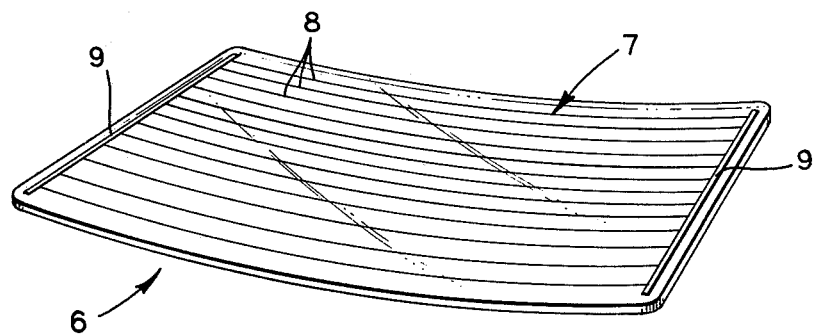
FIG. 2 is a perspective view of a glass sheet having a circuit imprinted thereon and bent in accordance with the present invention.

In order to produce the finished product illustrated in FIG. 2, the bowing or arching must be effected in a direction away from the glass surface having the printed grid thereon. Since the printed grid surface is oriented upwardly as the sheet passes between the blastheads 26 and 27, the greater cooling rate and consequent greater pressure must be applied against the bottom surface of the sheet. Preferably, the pressure of the air directed against the bottom surface of the sheet should be approximately twice the pressure directed against the upper surface.

Upon emerging through the furnace exit opening 25, the heated sheets S are successively received on a series of lower conveyor rolls 40 associated with the lower blasthead 27 and extending transversely thereacross in longitudinally spaced relation from the entry to the exit end of tempering section 13. Due to the greater pressure of the chilling air directed against the bottom surface of sheet S than against the upper surface thereof as pointed out above, there is a tendency for the sheet, especially a relatively thin sheet, to flutter or float on the rolls and thereby possibly adversely affect the flatness of the sheet, if not causing breakage thereof.

In order to overcome this problem, the tempering section 13 is provided with a series of upper transversely extending conveyor rolls 41 associated with the upper blasthead 26 in spaced relation to the lower conveyor rolls 40 and in substantial vertical alignment therewith. These upper rolls 41 not only restrain the vertical movement of the sheet as it advances between blastheads 26 and 27, but serve to literally convey the sheet which will be urged thereagainst by the greater air pressure applied to the bottom surface thereof.

Heretofore, rotating conveyor rolls of either solid or tubular construction employed in tempering apparatus of the type herein disclosed developed vibrations in tune with their natural frequencies. Often, the amplitude of these vibrations built up sufficiently to cause breakage of glass moving through the tempering section and sometimes was great enough to tear the roll covering, when present, and possibly damage other parts of the apparatus.

Figure 6:
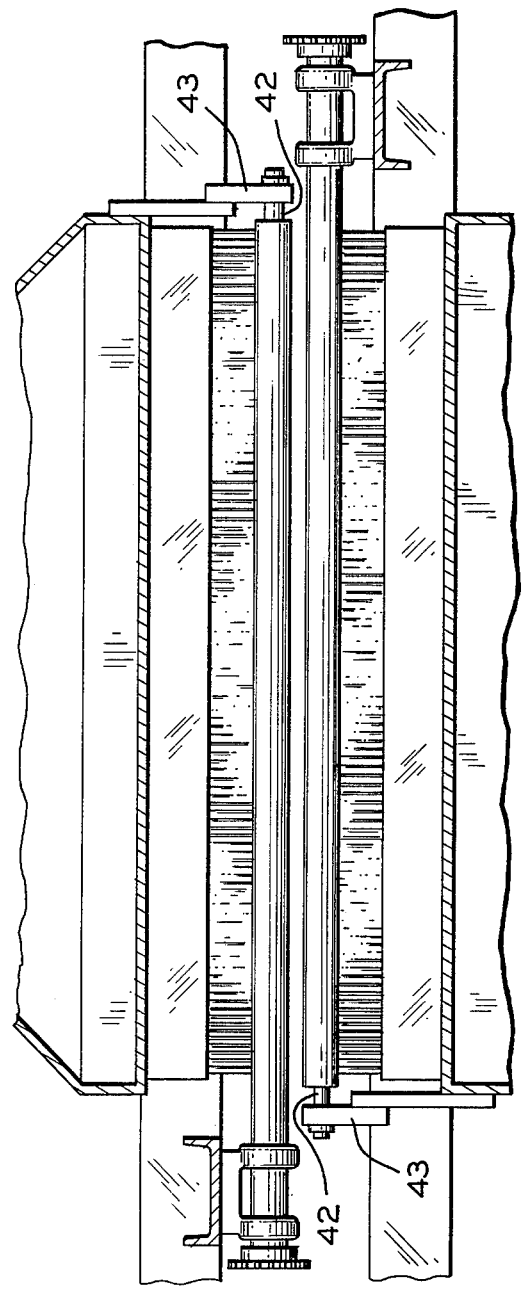
FIG. 6 is a cross sectional view of a conventional tempering section, illustrating the manner of mounting the upper and lower conveyor rolls associated therewith.

Moreover, when utilizing both upper and lower rolls, they were journalled for rotation at their opposite ends in bearings which had to be somewhat compromised in order to provide the desired close vertical spacing between the rolls. As shown in a known tempering apparatus of the upper-lower roll type depicted in FIG. 6, one end of each roll of a vertically spaced pair is provided with a reduced diameter end portion 42 journalled in a relatively small bearing block 43 connected to the blasthead superstructure. It should be understood that the size of the block 43 and consequently the bearing surface provided thereby was materially sacrificed in order to achieve the desired close vertical spacing between each pair of vertically spaced rolls. The loadings imposed on such inadequate bearings resulted in rapid wear and consequent frequent replacement. Moreover, the clearance between the roll end portion 42 and its bearing resulting from such wear during use induced wobbling and vibrations in excess of those normally expected by the natural frequencies of the rolls as explained above. This resulted in still more glass breakage and increased the possibility of damage to the apparatus.

Figures 3, 4, 5:
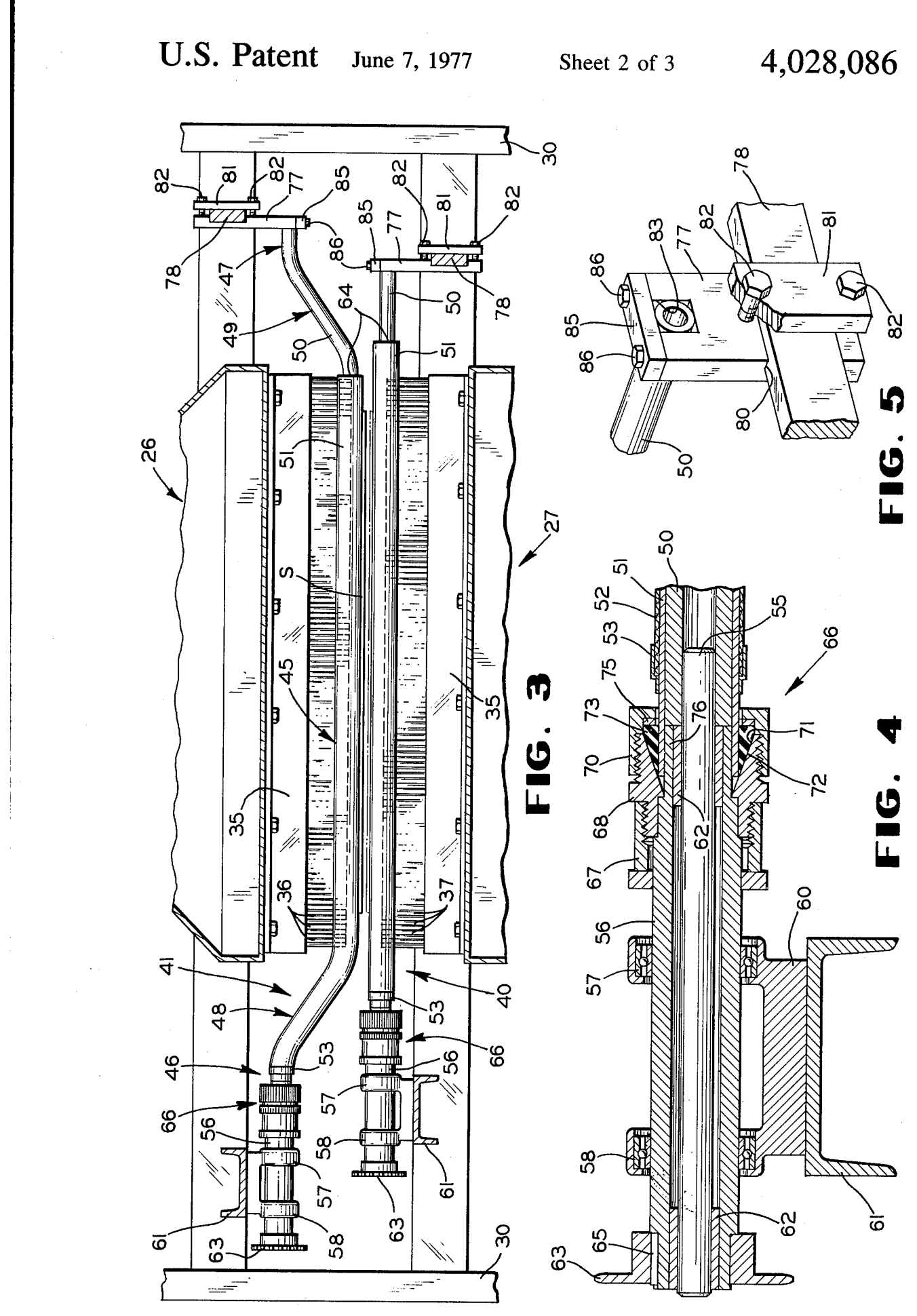

These problems are successfully solved in accordance with the present invention by the incorporation of flexible, composite conveyor rolls 40 and 41 which minimize vibrations and permit the installation of proper and adequate support mountings for the conveyor rolls. As best shown in FIG. 3, the upper rolls 41 are curved, having major linear central portions 45 in substantial parallelism with the lower conveyor rolls 40 and spaced therefrom a distance only slightly greater than the thickness of the sheet advancing therebetween. The upper conveyor rolls 41 are similarly constructed as the lower conveyor rolls 40, except that the former are curved and are provided with straight end portions 46 and 47 having a common axis joined to the central major portion 45 by inclined portions 48 and 49. Since both conveyor rolls 40 and 41 are identical in construction except for their overall configurations noted above, it is believed that a detailed description of one roll will suffice for both, the same reference characters being applied to identical parts.

With reference to FIGS. 3 and 4, each roll comprises an inner, hollow, flexible, substantially stationary core member 50 and an outer, flexible, load carrying, rotatable sleeve 51. To facilitate rotation of the outer sleeve 51 about core 50, the former may be comprised of a liner formed of suitable anti-friction material, such as flurocarbon resin for example, covered with a layer of stainless steel mesh to reinforce the same and prevent kinking thereof. While the outer sleeve 51 is flexible for conforming to the arcuate shape of the inner core 50, it is capable of transmitting torque without significant axial twist or distortion. The sleeve 51 can be covered with an asbestos or fiberglass material 52 (FIG. 4) to provide a resiliently yieldable, heat resistant, non-marring surface upon which the glass sheets are received. The covering is secured by stretching it over the sleeve 51 and fastening the ends thereto with pressure sensitive tape 53 or in some other suitable manner.

One end of each stationary inner core 50 is telescopically received upon and secured to a stub shaft 55 (FIG. 4) mounted in a rotatable collar 56 journalled for rotation in spaced bearings 57 and 58 mounted on a common block 60 carried on a rail 61 along one side of the tempering apparatus. Suitable sleeve bushings 62 are interposed between the stub shaft 55 and collar 56 to facilitate relative rotation therebetween. A pinion 63, adapted to be driven by a suitable endless drive chain (not shown) is rigidly secured to collar 56 by means of a key 65. This endless drive chain is trained about all the pinions 63 of the series of conveyor rolls for rotating the same in unison at the same angular speed about their respective chordal axes.

One end of each outer sleeve 51 is attached to the collar 56 by a coupling member, generally designated 66, while the opposite end of sleeve 51 is left free, as best shown at 64 in FIG. 3, for free rotation relative to its fixed core member 50. Coupling member 66 comprises a tubular body 67 welded or otherwise fixedly secured on collar 56 and threaded on one end of a specially configurated, union connecting member 68. The other end of male threaded member 68 receives a female connector member 70 disposed about the outer sleeve 51 for attaching the latter to its respective collar.

The internal surface 71 of the union member 68 adjacent one end thereof is tapered in order to engage the outer, conically shaped, complemental surface 72 of a gripping sleeve 73 having a bore for receiving the outer sleeve 51 therethrough. The gripping sleeve 73 is formed of rubber or any other suitable resiliently yieldable, elastomeric material and when compressed radially, exerts a radial clamping force on the outer sleeve 51. The rear end of gripping sleeve 73 is flat and bears against a washer 75 interposed between gripping sleeve 73 and the rear end wall of the female connector member 70.

In attaching the outer sleeve 51 to collar 56, the opposed, reduced diameter end portion 76 thereof is telescopically received in the end of sleeve 51. The female connector 70 is then threaded onto the union member 68, urging the gripping sleeve 73 radially inwardly for clamping the outer sleeve 51 against the reduced diameter end portion 76 of collar 56. In this manner, the outer sleeves 51 of the rolls are attached to their respective collars 56 for rotation about their own chordal axes, respectively, relative to their inner cores 50. The detailed construction of these rolls and their sleeve one end connections to coupling members 66, as well as their mode of operation, is similar to the conveyor rolls disclosed and claimed in U.S. Pat. No. 3,905,794, assigned to the same assignee as the present invention. However, the rolls 40,41 of this invention differ in that the other or opposite ends of the sleeves terminate substantially inwardly of the ends of their associated core members and remain unconnected for free rotation thereabout. This, of course, eliminates the need for a heavy duty bearing at such end, allowing the core member to be mounted on a relatively small, but adequate, supporting plate as will be presently described.

The end of each core member 50 remote from collar 56 is detachably mounted on an upright plate 77 supported on an elongated rail 78 extending lengthwise of the blastheads and suitably connected at their opposite ends to the superstructure of frame 28. The plate 77 is recessed, as best shown at 80 in FIG. 5, for receiving the complementary shaped rail 78 and is adjustably slidable thereon. The means for mounting plate 77 in its selectively adjustable position on rail 78 includes bracket 81 bearing against the opposite side of rail 78 and provided with vertically spaced fasteners 82 extending horizontally above and below rail 78 and threaded into suitably tapped openings formed in the opposing face of plate 77.

The plate 77 is provided at its upper end with a cut-out section or groove 83 of generally square configuration for receiving the end portion of core member 50. This end portion of core member 50 is secured in place by means of a clamping plate 85 bearing against the upper surface thereof and affixed to the upper end of plate 77 by suitable fasteners 86.

The use of flexible, composite conveyor rolls of a two-piece construction mounted for rotation at one end only, together with the fixed mountings at their non-driven ends, constitutes a significant feature of this invention. The flexibility of the rolls permits them to be bent in a manner providing the desired close spacing therebetween while offering sufficient clearance at their respective ends for the utilization of adequate support mountings and provide ready access into the interior of the tampering section for repair and for cullet removal. Also, vibrations and wobbling, otherwise induced in conventional one-piece rolls as a result of bearing wear occasioned by fictional rotation, are eliminated because the core members of the present composite rolls are fixed against rotation in their respective mountings. Moreover, the rotatable sleeves remain linearly true as a result of their guided rotation about axially stable, fixed core members to further minimize vibrations and afford a substantially true horizontal surface for the conveyance of the heat-softened glass sheets.

In operation, flat glass sheets S are loaded onto conveyor rolls 23 at the entrance end (not shown) of furnace 16 for movement through the heating chamber 17, wherein the sheets are progressively heated from room temperature to substantially the softening point of the glass, whereby all strain will be relieved. Each heated sheet passes through the exit opening 25 and is transferred onto the lower conveyor rolls 40 of tempering section 13 for passage between the upper and lower blastheads 26 and 27. A plurality of streams of cooling air are directed through the blasthead tubes 36 and 37 against the opposite surfaces of the sheet advancing therebetween to rapidly cool and thereby temper the glass sheet. Since it is desired to impart a downwardly directed bow or curvature to the sheet, i.e., in a direction away from the surface having the frit grid imprinted thereon as shown in FIG. 4, air at a relatively higher pressure is directed against the bottom surface of the sheet than against the upper surface thereof. Preferably, the ratio of the pressure directed against the sheet bottom surface to the pressure applied against the sheet upper surface should be about 2:1. For example, the pressure of the air directed against the sheet bottom surface should range from about 30 to 40 inch water column (W.C.) as opposed to a pressure of about 15 to 20 inch water column (W.C.) directed against the sheet upper surface, or a pressure differential ranging from about 15 to 20 inch water column. However, this differential, as well as the specific pressures applied, may vary as dictated by the temperature differential between the opposite surfaces of the sheet when it leaves furnace 16. This pressure differential is sufficient to lift the glass sheet upwardly off the lower conveyor rolls 40 and urge it upwardly against the upper conveyor rolls 41 which then become effective to convey the sheet through the blasthead. Stating this another way, the glass sheet tends to walk along or be conveyed by the upper series of conveyor rolls 41 for the remainder of its passage through the tempering section 13. The spacing between the upper and lower series of rolls 40 and 41 is sufficient to accommodate the thickness of the sheet plus a slight clearance, say about 0.060 of an inch for example, between the rolls and the glass surface.

The greater air pressure and consequent greater volume directed against the bottom surface of the sheet results in a faster rate of cooling thereof, causing the sheet to arch or bend about its transverse axis downwardly away from the upper conveyor rolls 41. However, because of the space restrictions imposed by the close proximity of the lower conveyor rolls 40, the sheet will not bow or arch downwardly to the desired full extent until leaving the tempering section 13. Just as soon as the sheet S advances past the conveyor rolls 40 and 41, it will pop or spring into shape with the desired curvature or arch therein directed downwardly into its final shape, such as that shown in FIG. 2.

Upon leaving the tempering section 13, the sheet is received on another series of conveyor rolls 90 which advance the bent sheet between the upper and lower blastheads 91 and 92 of cooling section 15. Streams of cooling air are directed by the blastheads through suitable tubes 93 against the opposite surfaces of the bent, tempered glass sheet in a well known manner to continue cooling of the sheets. During movement of the bent tempered sheets through cooling section 15, air under relatively low pressure, such as 2 to 5 inches water column for example, is applied to the opposite surfaces of the sheet. However, if desired, the pressure of the air upon the upper surface of the sheet can be somewhat greater than that applied to the lower surface such as to lightly or gingerly maintain the sheet on the conveyor rolls 90 without "drifting".

It should be appreciated that the apparatus of this invention also has utility in tempering flat glass, i.e., finished glass products having opposite planar surfaces without any curvatures or bends imparted thereto. Often, it is necessary to apply a slightly greater pressure to the bottom surface of the sheet, especially a thin sheet, than to the upper surface thereof for a variety of reasons, including counteracting the tendency for the sheet to warp or bow upwardly and thereby maintain the sheet in a perfectly flat condition. While the differential pressure is in the neighborhood of from about 2 to 4 inches water column, it can be sufficient to lift the sheet upwardly off the lower conveyor rolls and against the upper conveyor rolls 41. Again, these upper rolls 41 restrain vertical movement of the sheet and serve to convey the glass through the tempering area.

From the foregoing, it is apparent that the objects of the present invention have been fully accomplished. An improved apparatus is provided for tempering and bending glass sheets substantially simultaneously in an efficient manner by differential cooling and by employing composite rolls of a two-piece construction permitting the desired or necessary close spacing between vertically spaced rolls without sacrificing adequate support therefore and which minimizes vibrations and out of true alignment otherwise experienced with conventional rolls. Also, the use of sectionalized or modular tubing units in the blastheads provides for ready replacement of defective portions and, together with the additional clearance provided by the displaced end portions of the upper rolls, facilitates the removal of cullet and debris accummulated on the lower blasthead.

It is to be understood that the form of the invention herewith shown and described is to be taken as an illustrative embodiment of the same and that various changes in the shape, size and arrangement of parts may be resorted to without departing from the spirit of the invention.

We claim:

1. Apparatus for bending and tempering glass sheets comprising: a heating furnace, a chilling section, and a cooling section arranged substantially in line with one another, a conveyor for supporting and conveying a glass sheet along a generally horizontal path successively through said furnace, chilling section and cooling section, means in said furnace for heating said sheet as it passes through said furnace to substantially the softening temperature of the glass, means in said chilling section for directing a gaseous cooling medium under pressure against opposite surfaces of said sheet as it advances through said chilling section, means controlling the pressure of said cooling medium against said opposite surfaces to direct said cooling medium against the bottom surface of said sheet at a greater pressure than the pressure of said cooling medium directed against the upper surface thereof thereby to cool the bottom surface at a greater rate than said upper surface to cause said sheet to bend into a desired curvature, a series of driven rolls mounted in said chilling section above said conveyor, each of said rolls comprising a fixed core and a driven rotatable load supporting sleeve surrounding said core, each of said rolls comprising a generally horizontally extending central portion in substantial parallelism with said conveyor but spaced thereabove a distance slightly greater than the thickness of the glass sheets to be conveyed thereby so that said advancing sheet normally contacts only said conveyor or said roll central portions at any given time during its passage therebetween, each of said rolls including opposite end portions having a common axis disposed above said central portion and substantially above said conveyor for providing adequate clearance for the mounting structure of said conveyor, and inclined portions connecting said end portions to said central portion.

2. Apparatus according to claim 1, including means for connecting one end of said rotatable sleeve adjacent one end of said core to a drive means, the other end of said sleeve terminating substantially inwardly of the other end of said core for free rotation thereabout.

3. Apparatus according to claim 2, wherein said core is exposed at the end remote from said connecting means, and means for rigidly mounting said core against rotation at said exposed end.

4. Apparatus according to claim 1, wherein said means for directing said cooling medium against opposite surfaces of said sheet comprises opposed blastheads, each having a plurality of detachable sections provided with tubes, respectively.

5. Apparatus according to claim 3, wherein said mounting means comprises an upright bracket having a groove formed in one end thereof for receiving said exposed end of said core, and means for clamping said core exposed end in said groove.

6. Apparatus according to claim 5, including an elongated rail extending lengthwise of said chilling section, and means mounting said bracket on said rail for adjustable positioning therealong.

* * * * *